United States Patent Office 3,277,058
Patented Oct. 4, 1966

3,277,058
ALDEHYDE COPOLYMERS AND THEIR
PREPARATION
Bruce N. Bastian, Oakland, Calif., assignor to Shell Oil
Company, New York, N.Y., a corporation of Delaware
No Drawing. Filed Dec. 10, 1962, Ser. No. 243,601
15 Claims. (Cl. 260—67)

This invention relates to new aldehyde copolymers and their preparation. More particularly, the invention relates to new copolymers prepared from aldehydes and certain cyclic anhydrides, to their utilization, and to a process for their preparation.

Specifically, the invention provides new and particularly useful copolymers which comprise high molecular weight linear polyacetal polyester polymers possessing a main polymer chain containing dispersed therein a plurality of

groups, and preferably at least one

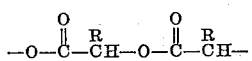

group, with substantially all of the remaining units being made up of alternating carbon and oxygen atoms.

The invention further provides a new process for preparing the above-described copolymers which comprises reacting an aldehyde or material which liberates an aldehyde, such as trioxane, with a cyclic anhydride of an alpha-hydroxy carboxylic acid, and preferably glycollide, in the presence of a Lewis acid or complex thereof, and preferably a halogen-containing Lewis acid catalyst, such as boron trifluoride and complexes thereof, under substantially anhydrous conditions.

It is known that saturated aldehydes, such as formaldehyde, can be converted to solid high molecular weight polymers by contacting the aldehydes with certain catalytic materials. While the resulting polymers find some use in industry, their utility in certain applications is limited by their deficient properties, such as poor dyeability, limited ability to form fibers, poor processability and lack of versatility as to form, i.e., always being a hard tough plastic rather than a rubber, soft flexible material, etc.

It is, therefore, an object of the invention to provide new and particularly useful aldehyde polymers. It is a further object to provide new aldehyde copolymers containing ester groups and a method for their preparation. It is a further object to provide new aldehyde copolymers which have many new and valuable properties which make them particularly useful and valuable in industry. It is a further object to provide new aldehyde copolymers which can be obtained in a variety of forms, such as hard solids, rubbers and the like. It is a further object to provide new aldehyde copolymers which have improved properties, such as dyeability, processability and the like. It is a further object to provide a new process for polymerizing aldehydes to form useful copolymers. These and other objects will be apparent from the following detailed description thereof.

It has now been discovered that these and other objects may be accomplished by the new copolymers of the invention which comprises high molecular weight linear polyacetal polyester polymers possessing a main polymer chain containing dispersed therein a plurality of

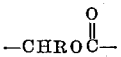

groups, and preferably at least one

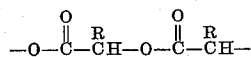

unit (wherein R is determined by the aldehyde or anhydride reactant and is preferably hydrogen or alkyl group) with substantially all of the remaining units being made up of alternating carbon and oxygen atoms. These new copolymers are preferably prepared by reacting an aldehyde or material which yields an aldehyde, such as trioxane, with a cyclic anhydride of an alpha-hydroxy carboxylic acid, and preferably glycollide, in the presence of a Lewis acid or complex thereof, and preferably a halogen-containing Lewis acid catalyst, such as boron trifluoride and complexes thereof, under substantially anhydrous conditions. It has been surprisingly found that this technique converts the aldehydes into high yields of the new ester-containing copolymers which have many improved properties. The new copolymers, for example, vary in form, depending on the number of ester groups introduced, from hard solids to rubbers and soft flexible plastic materials. In addition, the new copolymers have improved properties relative to processing, dyeability and formation of fibers.

The materials to be polymerized by the process of the invention include those having at least one free

group or under the conditions of the reaction form compounds containing aldehyde groups and are preferably free of conjugated double bonds. If the aldehyde has more than 2 carbon atoms, it is preferred to utilize them in their polymerized form as preferably trimer form. Preferred materials include trimer of formaldehyde (trioxane) and trimers of acetaldehyde butyraldehyde, isobutyraldehyde, propionaldehyde, valeraldehyde, dihydropyran carboxyaldehyde, hexanal, 2-ethylhexanal, acrolein, crotonaldehyde, furfural, phenylacetaldehyde, monochloroacetaldehyde, dichloroacetaldehyde, trichloroacetaldehyde, cyclohexanecarboxyaldehyde, methoxycyclohexanecarboxaldehyde, cyclohexanecarboxaldehyde, butoxyacetaldehyde, tetrahydrobenzaldehyde, glycidaldehyde, glyoxal, and the like, and mixtures thereof. Particularly preferred materials to be employed include formaldehyde and materials liberating formaldehyde including trioxane. By material liberating an aldehyde is meant one which releases the free aldehyde when the material is heated to say 150° C. or contacted with acidic catalysts.

The process of the invention can be used for the homopolymerization of any of the above-described aldehydes as well as the copolymerization of two or more of the said aldehydes, such as, for example, mixture of formaldehyde with acetaldehyde, chloral, propionaldehyde, butyraldehyde, tetrahydrobenzaldehyde and the like. In making the copolymers, the proportions of the different aldehydes may vary over a wide range, such as, for example, 1% to 99% of one aldehyde to 99% to 1% of the other aldehyde. In making copolymers from formaldehyde and the other aldehydes, it is generally preferred to prepare products having at least 5% by weight of formaldehyde, and preferably from 10% to 95% by weight of the formaldehyde, based on the total weight of the polymer.

The other components to be used in making the new copolymers include the cyclic anhydrides of alpha-hydroxy monocarboxylic acids, and preferably those of the formula

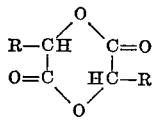

wherein R is hydrogen or an organic radical and preferably a hydrocarbon radical, such as an alkyl, alkenyl, aryl, alkaryl arylalkyl radial containing 1 to 10 carbon atoms. Examples of such anhydrides include glycollide which is the anhydride of glycollic acid, lactide, which is the anhydride of lactic acid, and other anhydrides such as the anhydride of alpha-hydroxypentanoic acid, alpha-hydroxyhexanoic acid and alpha-hydroxyhexenoic acid.

The catalyst used in the above-described process comprises a Lewis acid or complex thereof. By Lewis acid is meant a material which accepts an electron pair to form a coordinate bond. Examples of Lewis acids include, among others, aluminum trichloride, aluminum tribromide, aluminum trifluoride, ethyl aluminum dichloride, diethyl aluminum chloride, butyl aluminum dibromide, amyl aluminum dibromide, diamyl aluminum bromide, diethyl aluminum floride, antimony trifluoride, antimony tribromide, antimony trichloride, ethyl antimony dichloride, diethyl antimony chloride, stannic tetrachloride, acetyl perchlorate, boron trifluoride, and the like, and complexes thereof, such as, for example, boron trifluoride-ethyl ether complex, boron trifluoride-ethyl acetate complex, boron trifluoride-butyl ether complex, boron tribromide-ethyl ether complex and the like.

Preferred cataylsts to be used include the Lewis acids containing a metal of Groups III to V of the Periodic Table of Elements, and in addition a halogen, such as chlorine, bromine and fluorine, as well as the ether and ester complexes thereof, such as those obtained by reacting the Lewis acids with esters of monocarboxylic acids containing 1 to 10 carbon atoms or with ethers of monohydric alcohols containing 1 to 10 carbon atoms.

The amount of the above-described cataylsts to be employed in the process of the invention may vary over a considerable range. Preferred amounts vary from about .1 mole to 5 moles per 100 moles of aldehyde to be polymerized. Particularly good results are obtained when one utilizes about .8 to 1.2 moles of the catalyst per 125 moles of the aldehyde.

The polymerization may be conducted in bulk or in the presence of suitable solvents or diluents. Preferred solvents include the hydrocarbon liquid materials, such as heptane, octane, toluene, benzene, cyclohexane, nitrobenzene, and the like, and mixtures thereof. Sufficient solvent is employed so as to form a workable reaction mixture.

The reaction is conducted under substantially anhydrous conditions. This means that the reactants, reaction vessel, etc. must be substantially free of moisture. This may be accomplished by use of conventional techniques, such as heating, driers and the like.

The reaction is preferably conducted in an inert atmosphere of nitrogen, methane, ethane and the like or in vacuo.

The reaction can be conducted at room temperature or below, but it is generally desired to apply heat to accelerate the reaction. Temperatures generally range from about 0° C. to about 180° C. with preferred temperatures ranging from about 50° to 150° C.

The pressure employed in the process may be atmospheric, superatmospheric or subatmospheric depending on that which is desired or necessary for the operation of the process. Reduced pressures are utilized, of course, when the reaction is conducted in vacuum as indicated in the examples.

The length of the reaction period may vary over a considerable range depending on temperature and type of catalyst. In most cases, the polymerization will be accomplished in about 1 to 30 hours, and preferably around 1 to 15 hours.

The polymer may be recovered from the reaction mixture or mass by any suitable means, such as precipitation, extraction, filtration and the like. It is generally preferred to take up the reaction mixture in an alcohol so as to kill the catalyst and help remove the catalyst from the polymer particles, and then filter the mixture to recover the solid polymer.

The preferred method of operating the porcess comprises introducing the aldehyde or material which liberates the aldehyde along with the cyclic anhydride into the reaction vessel, introducing the desired Lewis acid catalyst and then heating the mixture for the desired time, say at temperatures of 50° C. to 150° C. for 1 to 10 hours. The solid polymer that is formed is then recovered by filtration, washed with an alcohol such as methanol and then dried.

As noted above, the process can be varied so as to give products having varied properties. This can be accomplished by varying the amount of ester groups contained within the polymer. The amount of ester groups may vary, for example, from 2 to as high or higher than several thousand per polymer chain. Particularly preferred polymers are those having from 1% to 50% of the units in the main polymer chain made up of

units. Those products having the lower amount of ester groups are the hard solid products while those having the larger amount of ester groups will vary from hard solids to rubbery products.

The amount of ester groups in the polymer may be controlled by varying the concentration of the cyclic anhydride in the reaction mixture. The preferred concentrations to be employed to give lower ester values vary from about .01 to 5 moles per 10 moles of aldehyde. Higher ester values are preferably obtained by use of about 5 to 150 moles per 10 moles of aldehyde.

The polymers obtained by the above-described process are high molecular weight linear polyacetalpolyesters possessing at least one of the above-noted ester groups in the chain with substantially all of the remaining units being alternating carbon and oxygen units. The molecular weight of the polymer will vary generally from about 20,000 to 1,000,000 or more as determined by the light scattering technique. As represented in terms of inherent viscosity, the polymers will have viscosities preferably ranging from about .09 to about 3.0 dl./g. (as determined at 60° C. in p-chlorophenol).

The polymers of the invention are relatively high melting solids having melting points ranging from about 150 to 200° C. The stability of the polymers will vary depending on the end group structure. Those polymers terminating in stable end groups, such as ether groups, as may be obtained when the Lewis acid ether complexes are used as catalysts, have good stability to heat and may be used directly in their intended applications. Those polymers terminated in OH groups, such as may be obtained when OH-containing materials such as alcohols, acids and water, may be present, have limited stability. These polymers may be stabilized by subsequent reaction with materials, such as anhydrides and the like, to form more stable ester or ether end groups. The polymers may be stabilized against oxidation by addition of aromatic amines as N,N-dioctyl p-phenylene diamine.

The polymers of this invention are generally insoluble in cold common solvents such as alcohol, acetone and the like, but are soluble in hot solvents, such as hot dimethyl formamide, benzyl alcohol and p-chlorophenol. The solubility of the polymer may be varied by the addition to the reaction mixture of various components, such as polymers of monoepoxides as polymers of ethylene and propylene oxides, and preferably those having molecular weights between 50,000 and 800,000 as determined by the light scattering technique, in amounts varying from about 0.05% to about 10% by weight of the aldehyde being polymerized.

The new polymers are also characterized by the fact that they may be reacted with caustic or related materials to effect hydrolysis at the ester groups and thus form segmented polymers having terminal OH, carboxyl or salt groups. These products are of particular value in that they may be used as carboxyl and OH terminated polymers for reaction with other materials such as polyhydric alcohols, polyisocyanates, polyepoxides, polyamines and the like, to form valuable block copolymers.

The polymers of the present invention may be utilized for a variety of different applications. They can be press molded into attractive plastic articles or formed into sheets, fibers and the like. They may be used by themselves in these applications or they can be combined with various plasticizing materials, such as esters, as dioctyl phthalate, tricresyl phosphate, 1,5-pentanediol dipropionate, hexanetriol triacetate, polyethylene glycols, polypropylene glycols, glycerol, hexanetriol, glycerol tributyl ether and the like, and mixtures thereof.

The new polymers may also be blended or otherwise combined with other polymers and resins or tars and pitches. They may be combined, for example, with epoxy resins, polyurethane resins, polyamides, urea-formaldehyde and phenol resins, polythiopolymercaptans, vinyl resins, coal tar, asphalt, middle oil, coal tar pitch, and the like, and in a great variety of different proportions. Blending is to improve stability, workability or extend commercial applications.

The new polymers of the invention having the necessary solubility in solvents may be utilized in the formation of surface coating compositions and impregnating compositions or for the treatment of cloth, paper and the like.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise indicated, parts are parts by weight as to catalysts and solids and parts by volume as to liquids.

Example I

This example illustrates the preparation of a copolymer of trioxane and glycollide using acetyl perchlorate as the catalyst.

A glass reactor was charged with 1.0 part of dry glycollide, 30.0 parts of dry trioxane and 100 parts of dry cyclohexane. The system was evacuated and heated to 78°. 0.01 part of acetyl perchlorate in 1.0 part of toluene was added. After 20 hours the reaction was cooled to room temperature and was quenched with 3.0 parts of triethyl amine. The fine white polymer (8.15 parts) was washed with acetone and vacuum dried. The polymer was acylated with pyridine and acetic anhydride to enhance its stability. The acylated polymer melted at 181° and contained 0.1 milliequivalent of ester per gram of polymer.

The inherent viscosity of the polymer in p-chlorophenol at 60° was 1.66 dl./g. before and after heating in vacuo at 222° for 20 minutes. The polymer showed excellent thermal stability decomposing with a first order rate constant of 0.0059 min.$^{-1}$ at 222° C. The polymer was melt pressed at 180° 2000 p.s.i. for 1 minute to produce a tough flexible film.

Example II

A mixture of 30.2 parts dry trioxane and 1.0 part glycollide was charged to a glass reactor. The system was evacuated (<1 mm.) and was cooled to −78°. Acetyl perchlorate (0.1 M, 0.1 part toluene) was added and the reaction was heated to 65°–70° for 22.5 hours. After work up as in Example I, 4.34 parts of a white copolymer having an inherent viscosity of 1.75 dl./g. (determined in p-chlorophenol at 60° C.) was obtained.

Examples III to X

Examples III to X were prepared in the following manner. Glass tubes were charged with dry monomers and 0.1 part of antimony trifluoride. The tubes were flushed with nitrogen, sealed and placed in a 90° oven for 2 days. The tubes were cooled to room temperature, quenched with 3.0 parts of triethyl amine and washed with methanol. After vacuum drying a series of polymers was obtained having properties ranging from thermoplastic powders to tough rubbers. The composition of the polymers parallels the starting composition as determined by infrared spectrophotometry.

| Example | Trioxane, parts | Glycollide, parts | Yield, parts | M.P., ° C. | |
| --- | --- | --- | --- | --- | --- |
| 3 | 10.0 | 0.00 | 9.22 | 176 | Powder—insoluble in CHCl$_3$. |
| 4 | 10.0 | 0.04 | 9.60 | 176 | Do. |
| 5 | 10.0 | 1.00 | 9.05 | 162 | Do. |
| 6 | 10.0 | 5.0 | 4.77 | 130 | Do. |
| 7 | 5.0 | 5.0 | 1.11 | 158 | Do. |
| 8 | 5.0 | 10.0 | 3.73 | 145 | Rubber soft soluble in CHCl$_3$. |
| 9 | 1.0 | 10.0 | 6.78 | 167–170 | Hard rubber flexible insoluble in CHCl$_3$. |
| 10 | 0.0 | 10.0 | 3.28 | 200–210 | Powder brittle insoluble in CHCl$_3$. |

Example XI 11.9 parts of dry trioxane and 7.0 parts glycollide were placed in a dry tube. The tube was evacuated (<10$^{-2}$ mm.) filled with dry nitrogen and the monomers were melted. 0.05 part freshly distilled boron trifluoride etherate was added to the melt and solidification occurred. The reaction mixture was brought to 130° and then placed in an 82° oven for 2 days. The reaction was quenched with triethyl amine and the polymer was washed with acetone and methanol in a high speed blender. The white powdery polymer (5.36 parts) contained 2.5 milliequivalents of ester per gram of polymer. The polymer softens at 169° with melting at 179°.

Example XII

A dry reaction flask equipped with stirrer and nitrogen inlet and outlet was charged with 12.9 parts of dry trioxane, 0.6 part glycollide and 100 parts heptane. On heating to 80° the monomers dissolved and .05 part of boron trifluoride etherate was added. Polymer precipitated. After three hours and 20 minutes 100 parts of heptane was added. Stirring and heating (83°) was continued for 24 hours. The reaction product (9.8 parts, M.P. 176°) was isolated in the normal way. The product contained 0.4 milliequivalent of ester per gram of polymer.

Example XIII 23.03 parts of dry trioxane and 1.0 part dry glycollide were melted under nitrogen and charged to a dry glass tube reactor. The tube was cooled to −78°, evacuated (<1 mm.) and 0.1 part boron trifluoride ethyl acetate complex was added. The tube was sealed and placed in a 100° bath for 1 hour. The polymer was treated with 3 parts triethyl amine, crushed and washed with acetone, aqueous sodium bicarbonate and water. After vacuum drying at 100° for 2 hours, 14.0 parts of a white copolymer was isolated. Glycollide incorporation was confirmed by infrared spectioscopy. The inherent viscosity of the copolymer in p-chlorophenol at 60° was 0.96 dl./g.

*Example XIV*

24.72 parts dry trioxane, 1.0 part glycollide and 0.1 part ethyl acetate in 60 parts nitrobenzene were sealed in a dry reactor at 25° C. 0.01 mole acetyl perchlorate in 1 part toluene was added and the reaction was held at 25° C. for 4 days. After a standard work up procedure 8.82 parts of white copolymer were isolated having an inherent viscosity of 1.05 dl./g. measured in p-chlorophenol at 60°.

*Example XV*

A dry glass tube reactor was charged with 23.19 parts of dry trioxane and dry 1.0 part glycollide under dry nitrogen. The system was evacuated (<1 mm.), cooled to −78° and 0.1 part boron trifluoride-tetrahydrofuran complex was added. The tube was sealed under vacuum and heated for 1 hour at 100°. After cooling to room temperature the tube was opened and 3 parts triethyl amine was added. The polymer was crushed, washed with acetone, aqueous sodium bicarbonate and water. After vacuum drying for 4 hours at 100° 17.19 g. of copolymer was obtained which melted at 178–180°. The polymer had an inherent viscosity of 1.01 g./dl. as measured in p-chlorophenol at 60° C.

*Example XVI*

Example I is repeated with the exception that glycollide is replaced with an equivalent amount of lactide. Related results are obtained.

*Example XVII*

Example III was repeated with the exception that the catalyst was ethyl aluminum difluoride. The product was a solid melting at 195° C.

I claim as my invention:

1. A process for preparing high molecular weight linear polyacetalpolyester polymers possessing a main polymer chain containing dispersed therein a plurality of

groups wherein R is a member of the group consisting of hydrogen and alkyl radicals containing up to 8 carbon atoms, with the remaining units in the main chain being made up of alternating carbon and oxygen atoms, which comprises contacting as sole reactants a material of the group consisting of saturated monoaldehydes containing up to 8 carbon atoms and materials which liberate such aldehydes with from .01 to 150 moles per 10 moles of aldehyde of a cyclic anhydride of an alpha-hydroxy monocarboxylic acid of the formula

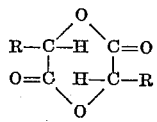

wherein R is a member of the group consisting of hydrogen or alkyl radicals in the presence of a catalyst of the group consisting of acetyl perchlorate, antimony trifluoride, aluminum halides, boron halides and ether and ester complexes thereof, under substantially anhydrous conditions and in the substantial absence of molecular oxygen.

2. A process for preparing high molecular weight linear polyacetal polyester polymers possessing a main polymer chain containing dispersed therein a plurality of

groups wherein R is a member of the group consisting of hydrogen and alkyl radicals containing up to 8 carbon atoms, with the remaining units in the main chain being made up of alternating carbon and oxygen atoms, which comprises reacting as sole reactants a trimer of a saturated monoaldehyde containing up to 8 carbon atoms with from .01 to 150 moles per 10 moles of aldehyde of a cyclic anhydride of an alpha-hydroxy monocarboxylic acid of the formula

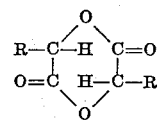

wherein R is a member of the group consisting of hydrogen or alkyl radicals in the presence of a catalyst of the group consisting of acetyl perchlorate, antimony trifluoride, aluminum halides, boron halides and ether and ester complexes thereof, under substantially anhydrous conditions and in an inert atmosphere.

3. A process as in claim 2 wherein the trimer is trioxane.

4. A process as in claim 2 wherein the cyclic anhydride is glycollide.

5. A process as in claim 2 wherein the cyclic anhydride is lactide.

6. A process as in claim 2 wherein the catalyst is a boron-trifluoride ether complex.

7. A process as in claim 2 wherein the catalyst is antimony trifluoride.

8. A process as in claim 2 wherein the catalyst is ethyl aluminum difluoride.

9. A process as in claim 2 wherein the catalyst is acetyl perchlorate.

10. A process as in claim 2 wherein the catalyst is boron trifluorodialkyl ether complex.

11. A process as in claim 2 wherein the temperature employed varies from 0° C. to 180° C.

12. A process as in claim 2 wherein the amount of catalyst varies from .1 to 5 moles per 100 moles of formaldehyde.

13. A process for preparing high molecular weight linear polyacetalpolyester polymers possessing a main polymer chain containing dispersed therein a plurality of

groups wherein R is a member of the group consisting of hydrogen and alkyl radicals containing up to 8 carbon atoms, with the remaining units in the main chain being made up of alternating carbon and oxygen atoms, which comprises reacting as sole reactants a material of the group consisting of saturated monoaldehydes containing up to 8 carbon atoms and materials which liberate such aldehydes with glycollide in the presence of a catalyst of the group consisting of acetyl perchlorate, antimony trifluoride, aluminum halides, boron halides and ether and ester complexes thereof, under substantially anhydrous conditions and in an inert atmosphere.

14. A process for preparing high molecular weight linear polyacetalpolyester copolymers possessing a main polymer chain containing dispersed therein a plurality of

groups with the remaining units in the main chains being made up of alternating carbon and oxygen atoms, which comprises reacting as sole reactants trioxane with glycollide in the presence of a catalyst of the group consisting of acetyl perchlorate, antimony trifluoride, aluminum halides, boron halides and ether and ester complexes thereof, under substantially anhydrous conditions and in an inert atmosphere.

15. A process for preparing high molecular weight linear polyacetal polyester polymers which comprises reacting as sole reactants a trimer of acrolein with glycollide in the presence of a catalyst of the group consisting of Lewis acids and complexes thereof, under substantially anhydrous conditions, in an inert atmosphere and under elevated pressures.

References Cited by the Examiner

UNITED STATES PATENTS

| | | | |
|---|---|---|---|
| 2,312,193 | 2/1943 | Richter | 260—83.5 |
| 2,366,738 | 1/1945 | Loder et al. | 260—67 XR |
| 2,371,990 | 3/1945 | Hanford | 260—67 |
| 2,478,154 | 8/1949 | Evans | 260—67 |
| 2,480,586 | 8/1949 | Loder | 260—67 |
| 3,026,299 | 3/1962 | Kray et al. | 260—67 |
| 3,122,525 | 2/1964 | Kern et al. | 260—67 |

OTHER REFERENCES

Kunststoffe, vol. 53, July 1963, pp. 424–36. English translation, pp. 11–22.

SAMUEL H. BLECH, *Primary Examiner.*

WILLIAM H. SHORT, *Examiner.*

L. M. MILLER, *Assistant Examiner.*